United States Patent [19]

Goto

[11] Patent Number: 4,862,935
[45] Date of Patent: Sep. 5, 1989

[54] CLAMPING APPARATUS FOR CLAMPING AN ANTISKID DEVICE FOR TIRES

[76] Inventor: Makoto Goto, 11-12, Takasago 1-chome, Katsushika-ku, Tokyo, Japan

[21] Appl. No.: 124,580

[22] Filed: Nov. 24, 1987

[30] Foreign Application Priority Data

Mar. 31, 1987 [JP] Japan .................................. 62-79447

[51] Int. Cl.$^4$ ........................................... B60C 27/00
[52] U.S. Cl. .................. 152/213 A; 152/221
[58] Field of Search ................. 152/213 A, 221, 222, 152/218, 217, 239, 242, 241; 24/230.5 W, 230.5 AD, 678, 589; 403/209, 213

[56] References Cited

U.S. PATENT DOCUMENTS

| | | | |
|---|---|---|---|
| 2,540,230 | 2/1951 | Andrews | 152/222 X |
| 4,055,210 | 10/1977 | Mongault | 152/221 X |
| 4,185,674 | 1/1980 | Giannone | 152/218 |
| 4,730,655 | 3/1988 | Yang | 152/213 A |

Primary Examiner—Michael W. Ball
Assistant Examiner—Geoffrey L. Knable
Attorney, Agent, or Firm—Nixon & Vanderhye

[57] ABSTRACT

A clamping apparatus for clamping an antiskid device for tires is disclosed, in which the antiskid device comprises a plurality of rubber antiskid members each of which is sandwiched by and connected to a pair of parallel side members through a metal clasper, wherein said clamping apparatus comprises a circular tension member made of rubber, and said plurality of metal claspers, each of said metal claspers having a first engagement portion adapted for engaging with said side members, a second engagement portion adapted for engaging with a corresponding one of said antiskid members and a third engagement portion adapted for engaging with said circular tension member, said circular tension member when in operation being fitted in said third engagement portion, whereby said metal claspers can be directed or attracted toward the center of said tire by means of the elastic reaction force of said circular tension members.

3 Claims, 4 Drawing Sheets

CLAMPING APPARATUS FOR CLAMPING AN ANTISKID DEVICE FOR TIRES

BACKGROUND OF THE INVENTION

The present invention relates to a clamping apparatus for clamping an antiskid device for tires. More particularly, the present invention relates to a clamping apparatus for clamping an antiskid device for tires, in which the antiskid device comprises a plurality of rubber antiskid members which are connected to a pair of parallel side members through respective metal claspers.

Conventionally, tire chains have been attached onto the tires of a car or spike tires have been fitted to the car before driving when it was expected to run on a snow-covered road or field in order to prevent the car from slipping. Recently, examples of most popular antiskid devices include those which comprise a pair of parallel side members such as side ropes and a plurality of rubber non-slip bands arranged between and connected to the side members so that a ladder-like construction can be obtained as described in Japanese Utility Model Application Laid-Open No. 113205/82. This type of the conventional antiskid devices are attached to tires by tightly fastening the side members such that the non-slip bands are in close contact with the outer peripheral surface of the tire.

However, the conventional antiskid devices are disadvantageous in that with increasing speed of cars driven and accordingly increasing rotational speed of the tires the non-slip rubber bands tend to expand outwardly due to centrifugal force exerted thereon and the expanded portion could touch a fender or other members or parts, resulting in that the bands would be damaged easily.

SUMMARY OF THE INVENTION

An object of the present invention is to obviate the above-described disadvantage of the conventional antiskid devices and provide a clamping apparatus for clamping an antiskid device for tires which can tightly fasten the antiskid device without adverse effect of centrifugal force exerted on antiskid members when the tires roll or are driven at high speeds.

As a result of extensive investigation, it has now been found that provision of a circular rubber tension member which is brought into engagement with a portion formed in each of the metal claspers so that the elastic reaction force generated when the tension member is in the operational position can cause the metal claspers to be directed or attracted toward the center of the tire.

Therefore, the present invention provides a clamping apparatus for clamping an antiskid device for tires, in which the antiskid device comprises a plurality of rubber antiskid members each of which is sandwiched by and connected to a pair of parallel side members through a metal clasper, wherein said clamping apparatus comprises a circular tension member made of rubber, and said plurality of metal claspers, each of said metal claspers having a first engagement portion adapted for engaging with said side members, a second engagement portion adapted for engaging with a corresponding one of said antiskid members and a third engagement portion adapted for engaging with said circular tension member, said circular tension member when in operation being fitted in said third engagement portion, whereby said metal claspers can be directed or attracted toward the center of said tire by means of the elastic reaction force of said circular tension members.

With this construction, the adverse effect of centrifugal force can be avoided with ease.

BRIEF DESCRIPTION OF THE DRAWINGS

Hereinbelow, the present invention will be described in detail with reference to the accompanying drawings in which.

DESCRIPTION OF PREFERRED EMBODIMENTS

Figure 1:
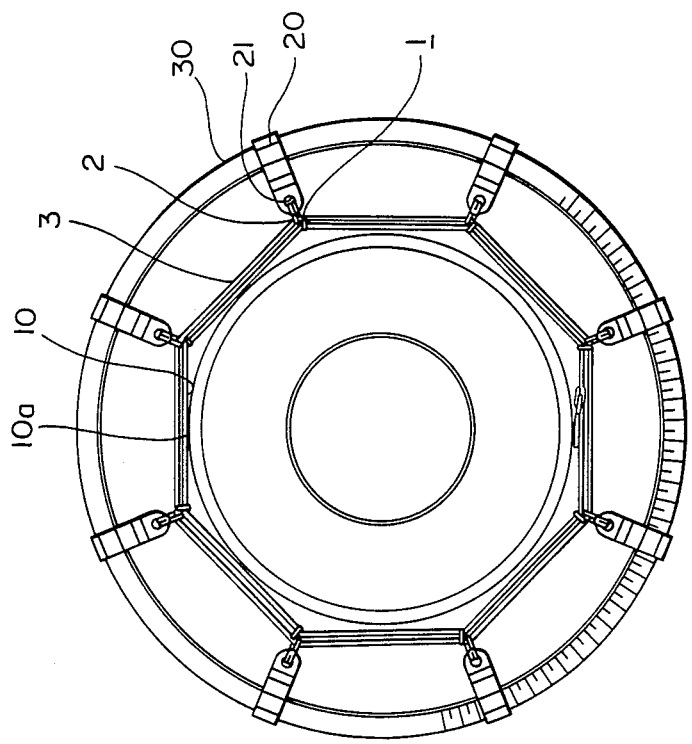
FIG. 1 is an illustration of fitting to a tire of a clamping apparatus for clamping an antiskid device for tires according to one embodiment of the present invention.

Referring to FIG. 1, reference numeral 1 designates a clamping apparatus for clamping an antiskid device for tires of the present invention. The clamping apparatus 1 comprises a plurality of metal claspers 2 and a tension member 3 which is made of rubber. The metal claspers 2 each have three engagement portions. The first engagement portion 4 is for engaging with one of a pair of side members 10 which, when in operation, are arranged substantially parallel to each other in such a manner that they are brought in contact with the side surfaces of a tire 30. The second engagement portion 5 is for engaging with an antiskid member 20. The third portion 6 is adapted for engaging with a circular tension member 3 made of rubber.

The second engagement portion 5 of the metal clasper 2 which is provided at the top thereof, is substantially in the form of a hook and adapted for the engagement with the antiskid member 20 through a through hole 21 provided therein at each end thereof. In operation, each antiskid member 20 is engaged with two metal claspers. The metal clasper 2 has at the bottom thereof the first engagement portion 4 which is substantially in the form of a circle or ring through which the side member 10 (or side rope 10a) can be passed and held slidably. On the middle of the metal clasper 2 is provided a semi-circular engagement portion 6 which is substantially in the form of a hook and adapted for engaging with the rubber tension member 3. The metal clasper 2 shown in FIG. 2 can be formed by bending a single wire rod of a suitable metallic material such as iron or steel.

Figure 3:
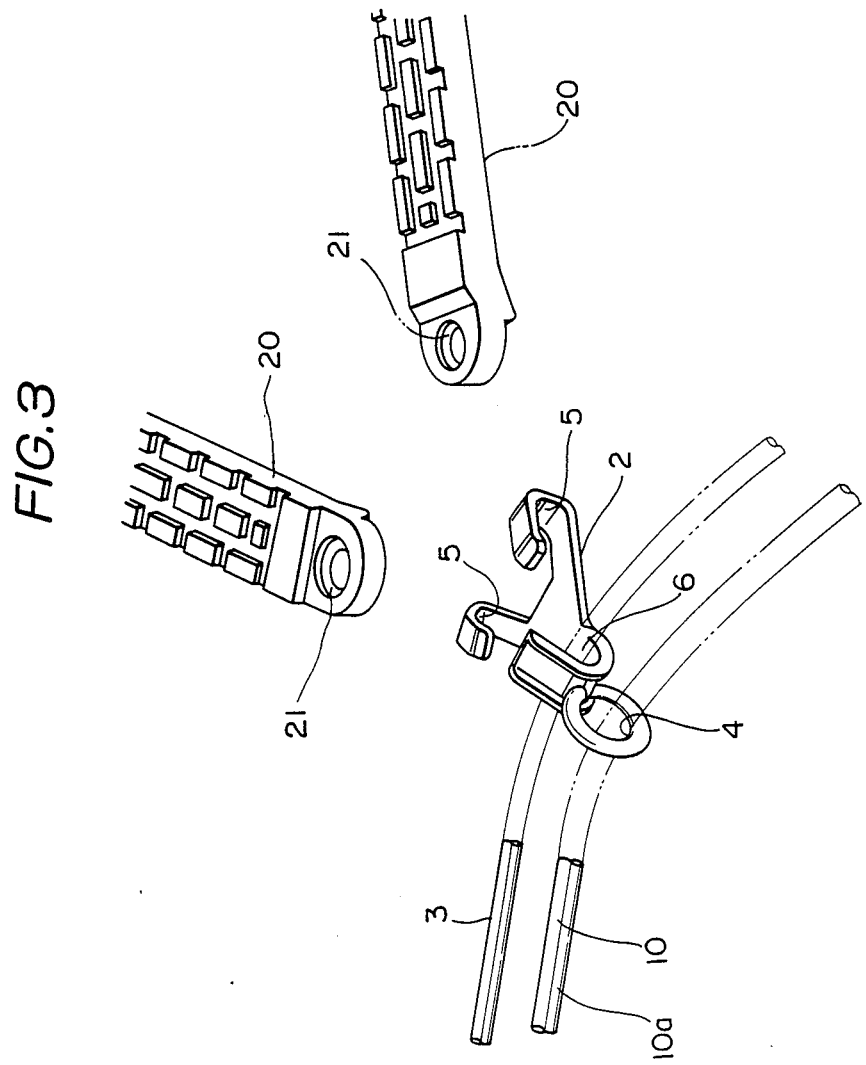
FIG. 3 is a perspective view of a clamping apparatus for clamping an antiskid device for tires according to another embodiment of the present invention.

On the other hand, the metal clasper 2 shown in FIG. 3 comprises a metal sheet having formed therein by bending two second engagement portions 5 which are in a bifurcate form on one end and a third engagement portion 6 on the opposite end and a substantially circular wire member 4 serving as a first engagement portion which is formed by curving a rivet-like metal wire rod after passing it through two through holes 1a provided near the bottom of the third engagement portion 6 to form a ring.

The first engagement portion 4 may be formed integrally with the second engagement portion 5 and the third engagement portion 6 or may be connected to them as by welding.

Figure 2:
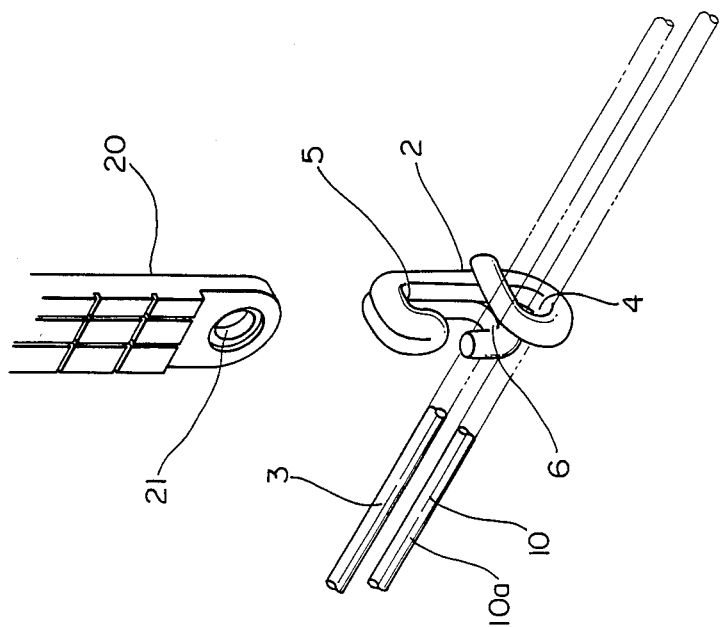
FIG. 2 is a perspective view of a metal clasper used in the clamping apparatus shown in FIG. 1.

In the metal claspers 2 shown in FIGS. 1, 2 and 3, the first engagement portion 4 for engaging with the side member 10 is provided on the bottom side, i.e., the side remote from the second engagement portion 5 which is to be engaged with the antiskid member 20, and the third engagement portion 6 for engaging with the tension member 3 is provided generally on the middle of the metal clasper 2. However, the first engagement portion 4 may be used as one for engaging with the tension member 3 and the third engagement portion 6 may be employed as one for engaging with the side member 10.

Further, in the embodiment shown in FIGS. 1 to 3, the first engagement portion 4 is in the form of a closed circle or ring and the third engagement portion 6 is in the form of a hook with an open space. However, both the first and third engagement portions may be a closed circle or a hook with an open space. Alternatively, the form of the first engagement portion 4 may be a hook with open space and that of the third engagement portion may be a closed circle.

The second engagement portion 5 for engaging with the antiskid member 20 may be a single hook as shown in FIG. 2 or bifurcated substantially in a V-letter form as shown in FIG. 3. Of course, the shape and material of the metal clasper 2 and specific construction, shape, size, and the like of the first, second and third engagement portions 4, 5 and 6, respectively, are not limited to those illustrated in FIGS. 1 to 3, and may be modified freely.

The tension member 3, which is generally circular in cross-section, can be made of any suitable rubber and is formed as a circle. The length of the circular tension member can be adjusted such that when the antiskid members 20 are fitted onto the outer periphery of the tire 30 and the respective antiskid members 20 are engaged with the corresponding metal claspers 2 at the respective second engagement portions 5 thereof and then the tension member 3 is fitted to the third engagement portion 6 the tension member 3 can exert an elastic reaction force on the antiskid members 20 to pull the antiskid members 20 toward the center of the tire 30 to thereby pressing the antiskid members 20 against the outer periphery of the tire 30.

Figure 4:
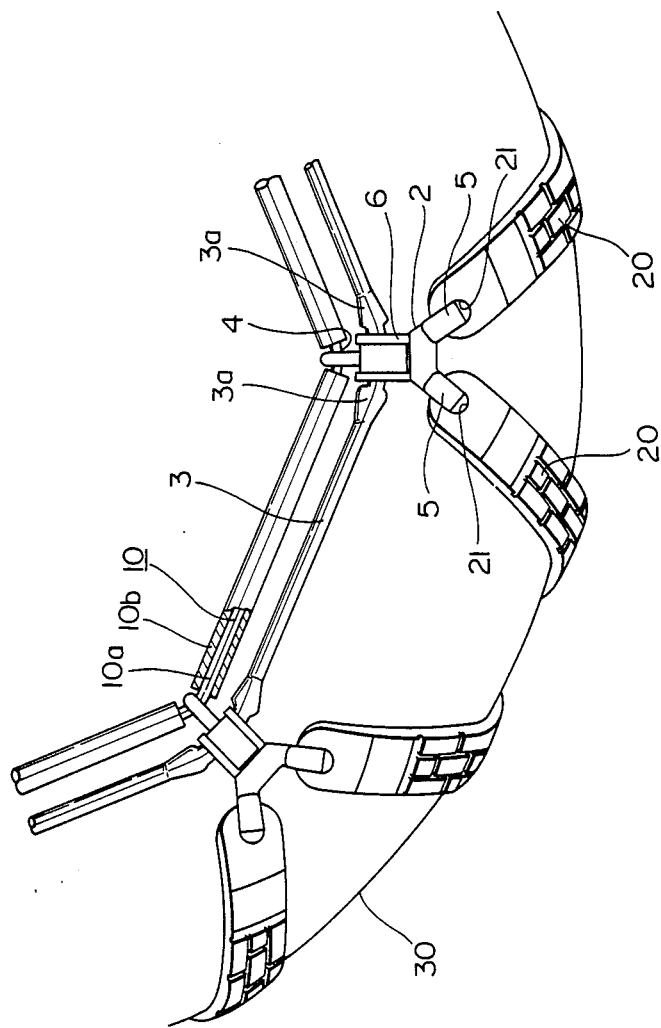
FIG. 4 is a partial elevation of the clamping apparatus shown in FIG. 3.

According to another preferred embodiment of the present invention, the rubber tension member 3 may be provided with a plurality of expanded portions 3a each smoothly tapering from the larger end to the small end so that the transverse outer size of the smaller end is substantially equal to the transverse size of that portion of the tension member excluding the expanded portions at predetermined positions as shown in FIG. 4. More specifically, a pair of the closest or mating expanded portions 3a are spaced so that when in operation the third engagement portion 6 for the engagement with the tension member 3 is sandwiched therebetween, which construction facilitates the positioning of the metal claspers 2.

Although use of a single tension member 3 for each side surface of the tire 30 is described in the foregoing embodiment a plurality of the tension members 3 can be used for each side surface of the tire 30 which are to be engaged respectively with only limited numbers of the metal claspers 2 positioned at a predetermined interval but in such a manner that all the metal claspers 2 can be engaged with at least one of the tension members 3. For example, eight metal claspers 2 as shown in FIG. 1 are tentatively divided in two groups by selecting every other metal clasper 2 and two rubber tension members 3 are engaged with the groups of the metal claspers, respectively, so that the two groups of the metal claspers 2 can separately be displaced toward the center of the tire 30. The specific construction, shape, number, material, etc. of the rubber tension member 3 are not limited to those illustrated in FIGS. 1 to 4 but can be modified freely.

The side member 10 may comprise a side rope 10a such as a wire rope or chain and a pipe 10b made of a synthetic resin having inserted therein the side rope 10a (FIG. 4). This construction is advantageous for protecting the side rope 10a.

In operation, at first the two side members 10 (side ropes 10a) are engaged with the metal claspers 2, e.g., by passing the side member 10 through the through holes (FIGS. 2 and 3) defined by the first engagement portion 4 of the metal clasper 2, and then, the second engagement portion of each of the metal claspers 2 is engaged with the hole 21 of each of the antiskid members 20 with the antiskid members 20 being arranged substantially parallel to each other at a predetermined space to form a ladder-like assembly. Then, the resulting ladder-like assembly is fitted onto the tire 30. Upon the fitting, each of the metal claspers 2 attached to the side members (side ropes 10a) automatically slides along the side member 10 (side rope 10a) to a predetermined position by accomplishing the clamping operation of the side member 10 (side rope 10a). Thereafter, the rubber tension member 3 is forcedly engaged with each of the metal claspers 2 at the third engagement portions thereof.

The clamping apparatus of the present invention can be applied to so-called ladder type antiskid members, so-called net type antiskid members which is formed integrally, antiskid members having X- or Y-configuration, etc.

With the clamping apparatus of the present invention, outward expansion of the rubber antiskid members which would otherwise occur due to centrifugal force exerted thereon with increasing speed of cars driven and accordingly with increasing rotational speed of the tires can be effectively prevented, and therefore, damage of antiskid members as has been experienced with the conventional means as a result of the fact that the antiskid members touch the fender or other members or parts of the car can be prevented. Further, the antiskid members can be brought in a closer contact with the outer periphery of the tire 30 which surely prevents the antiskid members from slipping out of the predetermined position with respect to the tire 30 or from being distorted by themselves.

The clamping apparatus of the present invention can be applied to a wide variety of antiskid members and can use various types of side members, and therefore, can be used for general purpose.

The combined use of the rubber tension member 3 and the side member 10 is advantageous since a strong force if any applied to the antiskid members is absorbed by the side member 10, reducing the possibility that the side member 10 could be transformed to a greater extent before the rubber tension member 3 breaks.

In the construction of the clamping apparatus of the present invention the metal clasper 2 to be used can be of a simple construction and therefore is suited for mass production. Furthermore, the first engagement portion 4 can be fitted to the side member 10 without difficulty. The second engagement portion 5 can be engaged with the through hole 21 of the antiskid members 20 with ease. The third engagement portion 6 can be engaged with the rubber tension member 3 easily. When the metal claspers 2 having bifurcate type second engagement portion 5 are used the number of the metal claspers 2 to be used can be reduced as well as the antiskid members can be supported very stably.

Further, when the first engagement portion 4 of the metal clasper 2 for the engagement with the side member 10 is circular not only there is no fear that the first engagement portion 4 could slip out of the side member 10 (side rope 10a) but also the fitting position of the metal clasper 2 can be adjusted appropriately and with ease.

When the first engagement portion 4 of the metal clasper 2 for the engagement with the side member is shaped in the form of a hook the first engagement portion 4 can be fitted to any desired position on the side chain and it is easy to alter the number of the antiskid members depending on the size or other factor of the tire 30.

Provision of protective pipes 10b around the side rope 10a makes it sure to protect the side rope 10a and greatly improve the durability thereof.

What is claimed is:

1. A clamping apparatus for clamping an antiskid device for a tire having an outer periphery and opposite side surfaces, said antiskid device including a plurality of rubber antiskid members disposable across said outer periphery of said tire and a pair of elongated side members periphery disposed on said opposite side surfaces of said tire in substantially parallel relation to each other and connectable to said antiskid members so as to fasten said antiskid members to said tire, said clamping apparatus comprising:

a plurality of metal claspers for interconnecting said antiskid members with one of said elongate side members; and a circular rubber tension member substantially coaxially disposable on one of said opposite side surfaces of said tire and directly connectable to said metal claspers for urging said metal claspers towards the center of said tire, each of said metal claspers comprising:

a first engagement portion for engaging with one of said elongate side members;

a second engagement portion for engaging with a corresponding one of said antiskid members; and a third engagement portion for engaging with said circular rubber tension member, said circular rubber tension member, when in operation, being fitted with said third engagement portion, said circular rubber tension member being provided with a plurality of pairs of expanded portions disposed at predetermined positions, each said pair of expanded portions being spaced from each other at such an interval that said third engagement portion of a corresponding one of said metal claspers is engageable with that portion of the tension member between the corresponding pair of expanded portions, each of said expanded portions having larger and smaller opposite ends, said larger end being adjacent to the mating expanded portion, said smaller end being remote from the mating expanded portion, each of said expanded portions smoothly tapering from said larger end to said smaller end so that the transverse outer size of said smaller end is substantially equal to the transverse size of that portion of said tension member excluding the expanded portions.

2. The clamping apparatus as claimed in claim 1, wherein each of said metal claspers is made of a bent wire rod, wherein said first engagement portion substantially in the form of a circle through which the corresponding one of said side members is slidably engageable, said first engagement portions being positioned on a bottom or radially innermost side of said metal clasper, wherein said second engagement portion is substantially in the form of a hook and is positioned on a top or radially outermost side of said metal clasper, and wherein said third engagement portion is substantially in the form of a hook and is positioned in a middle portion of said metal clasper intermediate said first and second engagement portions of said clasper.

3. The clamping apparatus as claimed in claim 1, wherein each of said metal Claspers is made of a bent metal sheet and a bent wire rod attached to a bottom or radially innermost side of said metal sheet, wherein said first engagement portion is substantially in the form of a ring made of said wire rod, wherein said second engagement portion is positioned on a top or radially outermost side of said metal sheet and is substantially bifurcated with each side branch being substantially in the form of a hook, and wherein said third engagement portion is substantially in the form of a hook and is positioned on the bottom or radially innermost side of said metal sheet.

* * * * *